United States Patent
Zhu et al.

(10) Patent No.: US 11,899,837 B2
(45) Date of Patent: Feb. 13, 2024

(54) EYE GAZE TRACKING

(71) Applicant: Huawei Technologies Co., Ltd., Shenzhen (CN)

(72) Inventors: Yingxuan Zhu, Cambridge, MA (US); Wenyou Sun, San Jose, CA (US); Jian Li, Waltham, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 17/716,438

(22) Filed: Apr. 8, 2022

(65) Prior Publication Data
US 2022/0229492 A1    Jul. 21, 2022

Related U.S. Application Data

(63) Continuation of application No. PCT/US2019/055412, filed on Oct. 9, 2019.

(51) Int. Cl.
*G06F 3/01*    (2006.01)
*G06T 7/68*    (2017.01)
(Continued)

(52) U.S. Cl.
CPC .............. *G06F 3/013* (2013.01); *G06F 3/14* (2013.01); *G06T 7/68* (2017.01); *G06V 10/143* (2022.01);
(Continued)

(58) Field of Classification Search
CPC ... G06F 3/013; G06F 3/14; G06T 7/68; G06T 2207/10028; G06V 10/42; G06V 10/143;
(Continued)

(56) References Cited

U.S. PATENT DOCUMENTS 7,409,085 B2    8/2008    Hu et al.
7,436,988 B2    10/2008   Zhang et al.
(Continued)

FOREIGN PATENT DOCUMENTS

EP    2847605 B1    1/2019
WO    WO-2019081087 A1 *  5/2019    ........... G06T 17/005

OTHER PUBLICATIONS

Liu, Yanxi, et al., "Robust Midsagittal Plane Extraction from Normal and Pathological 3-D Neuroradiology Images," IEEE Transactions on Medical Imaging, vol. 20, No. 3, Mar. 2001, 18 pages.
(Continued)

*Primary Examiner* — Stephen G Sherman
(74) *Attorney, Agent, or Firm* — Vierra Magen Marcus LLP

(57) ABSTRACT

The disclosure relates to technology for detecting and tracking eye gaze. An apparatus comprises a visible wavelength camera, an infrared (IR) camera, and one or more processors. The one or more processors are configured to generate a three-dimensional (3D) point cloud of a person's face from IR data captured from the IR camera, generate a two-dimensional image of the person's face from visible wavelength data captured from the visible wavelength camera, and detect a symmetry plane of the person's face based on the 3D point cloud and the two-dimensional image. The symmetry plane divides the 3D point cloud into two portions. The one or more processors are further configured to reconstruct the 3D point cloud based on the symmetry plane, and track eye gaze of the person's face based on the reconstructed 3D point cloud.

19 Claims, 10 Drawing Sheets

(51) Int. Cl.
  *G06V 40/16* (2022.01)
  *G06F 3/14* (2006.01)
  *G06V 10/42* (2022.01)
  *G06V 10/143* (2022.01)
  *G06V 40/19* (2022.01)
  *G06V 40/18* (2022.01)
(52) U.S. Cl.
  CPC ............ *G06V 10/42* (2022.01); *G06V 40/161* (2022.01); *G06V 40/172* (2022.01); *G06V 40/19* (2022.01); *G06V 40/193* (2022.01); *G06T 2207/10028* (2013.01)
(58) Field of Classification Search
  CPC .... G06V 10/19; G06V 10/193; G06V 40/172; G06V 40/161
  See application file for complete search history.

(56) References Cited

U.S. PATENT DOCUMENTS

| | | | |
|---|---|---|---|
| 8,360,580 B2 | 1/2013 | Chauveau | |
| 9,418,306 B2 | 8/2016 | Bae et al. | |
| 10,048,749 B2 | 8/2018 | Miao et al. | |
| 2010/0045596 A1* | 2/2010 | De Leon | G06F 3/013 345/157 |
| 2013/0033524 A1* | 2/2013 | Wang | G06F 3/0485 345/156 |
| 2013/0083976 A1* | 4/2013 | Ragland | A61B 3/113 382/117 |
| 2014/0268054 A1 | 9/2014 | Olsson et al. | |
| 2018/0113508 A1 | 4/2018 | Berkner-Cieslicki et al. | |
| 2019/0196602 A1* | 6/2019 | Mujibiya | G06F 3/0346 |
| 2019/0339770 A1* | 11/2019 | Kurlethimar | G02B 27/017 |
| 2019/0340428 A1* | 11/2019 | Wickett | H04L 51/224 |

OTHER PUBLICATIONS

Loy, Gareth, et al., "Fast Radial Symmetry for Detecting Points of Interest," IEEE Transactions on Pattern Analysis and Machine Intelligence, vol. 25, No. 8, Aug. 2003, 15 pages.
Hansen, Dan W., et al., "In the Eye of the Beholder: A Survey of Models for Eyes and Gaze," IEEE Transactions on Pattern Analysis and Machine Intelligence, vol. 32, No. 3, Mar. 2010, 23 pages.
Lemley, Joseph, et al., "Convolutional Neural Network Implementation for Eye-Gaze Estimation on Low-Quality Consumer Imaging Systems," IEEE Transactions on Consumer Electronics, vol. 65, No. 2, May 2019, 9 pages.
Kuo, Tzu-Sheng, et al., "Depth From Gaze," 25th IEEE International Conference on Image Processing (ICIP), Oct. 2018, 5 pages.
Reisfeld, Daniel, et al., "Robust Detection of Facial Features by Generalized Symmetry," Proceedings. 11th IAPR International Conference on Pattern Recognition, Sep. 1992, 4 pages.
Ba, Sileye O., et al., "Recognizing Visual Focus of an Attention From Head Pose in Natural Meetings," IEEE Transactions on Systems, Man, and Cybernetics—Part B: Cybernetics, vol. 39, No. 1, Feb. 2009, 18 pages.
Yoo, Dong H., et al., "A novel non-intrusive eye gaze estimation using cross-ratio under large head motion," Computer Vision and Image Understanding, Oct. 2004, 27 pages.
Gesu, Vito D., et al., "Symmetry Operators in Computer Vision," Vistas in Astronomy, vol. 40, No. 4, pp. 461-468, 1996, 8 pages.
Cao, Lin, et al., "Gaze-Aided Eye Detection via Appearance Learning," 24th International Conference on Pattern Recognition (ICPR), Nov. 2018, 6 pages.
Ba, Sileye O., et al., "Multiperson Visual Focus of Attention from Head Pose and Meeting Contextual Cues, " IEEE Transactions on Pattern Analysis and Machine Intelligence, vol. 33, No. 1, Jan. 2011, 16 pages.
Kar, Anuradha, et al., "A Review and Analysis of Eye-Gaze Estimation Systems, Algorithms and Performance Evaluation Methods in Consumer Platforms," IEEE Access, vol. 5, Aug. 2017, 25 pages.
Gneo, Massimo, et al., "A free geometry model-independent neural eye-gaze tracking system," Journal of NeuroEngineering and Rehabilitation, 2012, 15 pages.
Ji, Qiang, et al., "Eye and Gaze Tracking for Interactive Graphic Display," Int. Symp. on Smart Graphics, Jun. 2002, 7 pages.
International Search Report & The Written Opinion of the International Searching Authority dated Aug. 27, 2020, International Application No. PCT/US2019/055412.
Li, Billy Y., et al., "Robust RGB-D face recognition using Kinect sensor," Neurocomputing, vol. 214, Jun. 2016, Abstract only, 3 pages.
International Preliminary Report on Patentability dated Apr. 12, 2022, International Application No. PCT/US2019/055412.
Xu, Yanyu, et al., "Gaze Prediction in Dynamic 360° Immersive Videos," IEEE/CVF Conference on Computer Vision and Pattern Recognition, Jun. 18, 2018, 10 pages.

\* cited by examiner

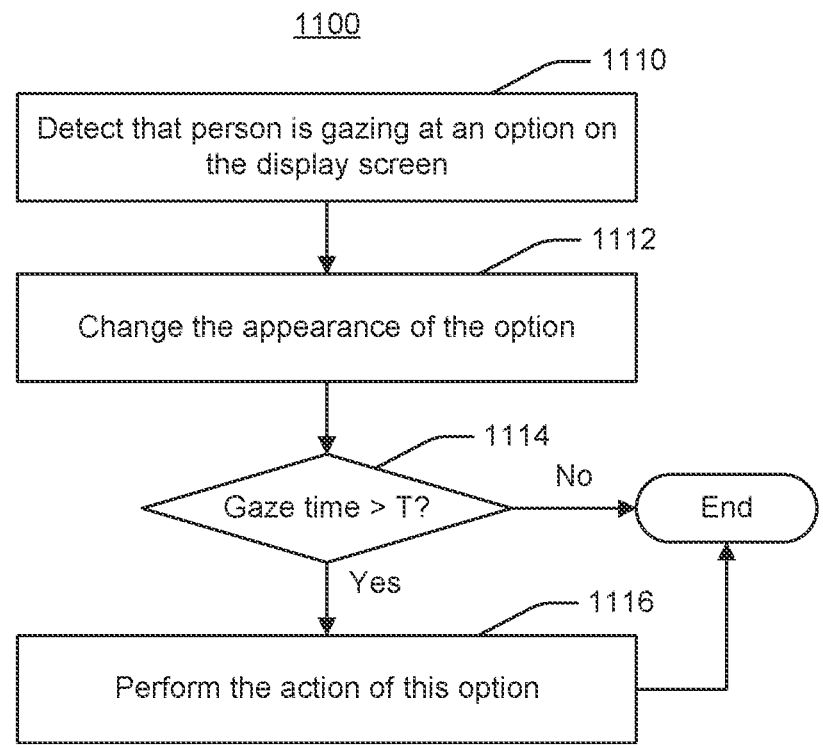
*FIG. 11*
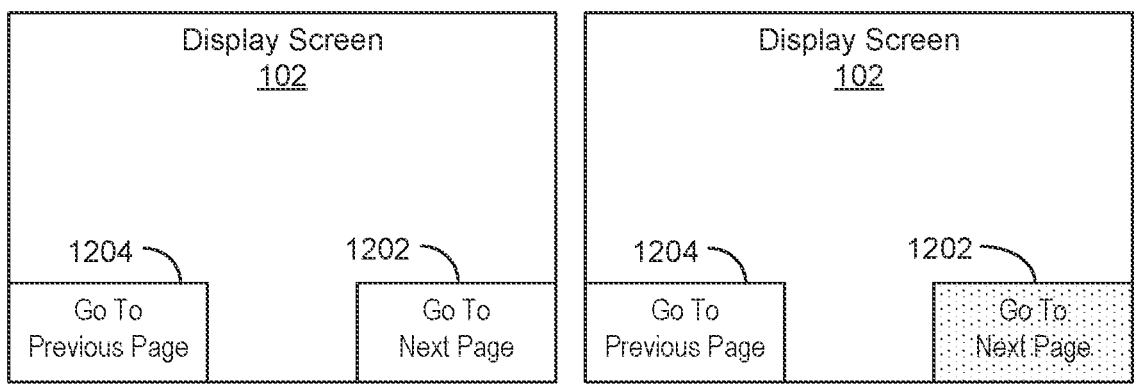
*FIG. 12A*  *FIG. 12B*

EYE GAZE TRACKING

CLAIM FOR PRIORITY

This application is a continuation of and claims the benefit of priority to International Appl. No. PCT/US2019/055412, filed Oct. 9, 2019, the contents of which are hereby incorporated by reference.

FIELD

The disclosure generally relates to eye gaze tracking.

BACKGROUND

A bilaterally symmetrical object possesses symmetry with respect to a symmetry plane. A human is bilaterally symmetrical with respect to a sagittal plane. The sagittal plane divides the person into a left side and a right side, which are symmetrical. One could consider the entire human body as a bilaterally symmetrical object, or a portion of the human body such as the face as a bilaterally symmetrical object. In this example of a human, the sagittal plane is a symmetry plane. Inanimate objects, such as a ball or drinking cup may also be bilaterally symmetrical. A bilaterally symmetrical object need not be perfectly symmetrical with respect to the symmetry plane. For example, most humans have some differences between the right and left sides of their faces.

BRIEF SUMMARY

According to one aspect of the present disclosure, there is provided an apparatus for eye gaze tracking. The apparatus comprises a visible wavelength camera, an infrared (IR) camera, and one or more processors. The one or more processors are configured to generate a three-dimensional (3D) point cloud of a person's face from IR data captured from the IR camera. The one or more processors are configured to generate a two-dimensional image of the person's face from visible wavelength data captured from the visible wavelength camera. The one or more processors are configured to detect a symmetry plane of the person's face based on the 3D point cloud and the two-dimensional image. The symmetry plane divides the 3D point cloud into two portions. The one or more processors are configured to reconstruct the 3D point cloud based on the symmetry plane. The one or more processors are configured to track eye gaze of the person's face based on the reconstructed 3D point cloud.

Optionally, in any of the preceding aspects, the one or more processors are further configured to solve a cost function to detect the symmetry plane, the cost function comprises a first parameter that provides a first weight for a first symmetrical half of the person's face and a second parameter that provides a second weight for a second symmetrical half of the person's face.

Optionally, in any of the preceding aspects, the apparatus further comprises a display screen, and the one or more processors are further configured to determine a location on the display screen at which the person is gazing based on the reconstructed 3D point cloud.

Optionally, in any of the preceding aspects, the one or more processors are further configured to automatically scroll content of the display screen in response to the location on the display screen at which the person is gazing being in a pre-defined region of the display screen.

Optionally, in any of the preceding aspects, the one or more processors are further configured to change an appearance of an element on a display screen in response detecting that the person is gazing at the element.

Optionally, in any of the preceding aspects, the one or more processors are further configured to predict a next position of the person's gaze based on outputs of a sequence of long short-term memory (LSTM) cells.

Optionally, in any of the preceding aspects, the one or more processors are further configured to integrate image registration and image transformation into each of the LSTM cells.

Optionally, in any of the preceding aspects, the one or more processors are further configured to perform registration of the reconstructed 3D point cloud of the person's face to another 3D point cloud of the person's face using a long short-term memory (LSTM) cell.

Optionally, in the preceding aspect, other 3D point cloud is a standard 3D point cloud that was captured with the person gazing at a known location.

Optionally, in any of the preceding aspects, the reconstructed 3D point cloud is a first reconstructed 3D point cloud captured at a first point in time, and the other 3D point cloud is a second reconstructed 3D point cloud captured at a second point in time that is prior to the first point in time.

Optionally, in any of the preceding aspects, the one or more processors are further configured to perform transformation of the reconstructed 3D point cloud of the person's face to another 3D point cloud of the person's face using a long short-term memory (LSTM) cell.

Optionally, in any of the preceding aspects, the person's face comprises a person's face, and the one or more processors are further configured to determine corresponding pairs of points between the reconstructed 3D point cloud of the person's face and a standard 3D point cloud of the person's face using a long short-term memory (LSTM) cell. The standard 3D point cloud is captured with the person gazing at a known location. The one or more processors are further configured to measure differences between the corresponding pairs of points using the LSTM cell.

Optionally, in the preceding aspect, the one or more processors are further configured to perform facial recognition of the person based on the differences between the corresponding pairs of points.

Optionally, in any of the preceding aspects, the one or more processors are further configured to determine corresponding pairs of points between a first version of the reconstructed 3D point cloud of the person's face captured at a first point in time and a second version of the reconstructed 3D point cloud of the person's face captured at a second point in time, including determine the corresponding pairs using a long short-term memory (LSTM) cell. The one or more processors are further configured to measure differences between the corresponding pairs of points using the LSTM cell.

Optionally, in the preceding aspect, the person's face comprises a person's face, and the one or more processors are further configured to determine a direction of an eye gaze of the person based on the differences between the corresponding pairs of points.

Optionally, in the preceding aspects, the one or more processors are further configured to: generate a three-dimensional (3D) point cloud of a bilaterally symmetrical object from IR data captured from the IR camera; generate a two-dimensional image of the bilaterally symmetrical object from visible wavelength data captured from the visible wavelength camera; detect a symmetry plane of the bilaterally symmetrical object based on the 3D point cloud of the bilaterally symmetrical object and the two-dimensional image of the bilaterally symmetrical object, the symmetry plane divides the 3D point cloud into two portions; and reconstruct the 3D point cloud of the bilaterally symmetrical object based on the symmetry plane.

Optionally, in the preceding aspects, the one or more processors are further configured to derive color information for voxels in the 3D point cloud based on the two-dimensional image.

A further aspect comprises a method for eye gaze tracking. The method comprises generating a three-dimensional (3D) point cloud of a person's face from infrared (IR) data captured from an IR camera. The method further comprises generating a two-dimensional image of the person's face from visible wavelength data captured from a visible wavelength camera. The method further comprises detecting a symmetry plane of the person's face based on the 3D point cloud and the two-dimensional image, the symmetry plane divides the 3D point cloud into two portions. The method further comprises reconstructing the 3D point cloud based on the symmetry plane. The method further comprises tracking eye gaze of the person's face based on the reconstructed 3D point cloud.

A further aspect comprises an electronic device for detecting eye gaze. The electronic device comprises at least one camera and one or more processors. The one or more processors are configured to generate an image of a person's face from data captured from the at least one camera, and input the data into a long short-term memory (LSTM) cell to determine a direction of the person's gaze.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 11 is a flowchart of one embodiment of a process of an electronic device providing a person selection option on a display screen in response to detecting the person is gazing at the location on the screen.

FIG. 12A shows a display screen having a first option and a second option.

FIG. 12B shows one example of changing the appearance of the first option on the display screen of FIG. 12A.

DETAILED DESCRIPTION

Figure 1:
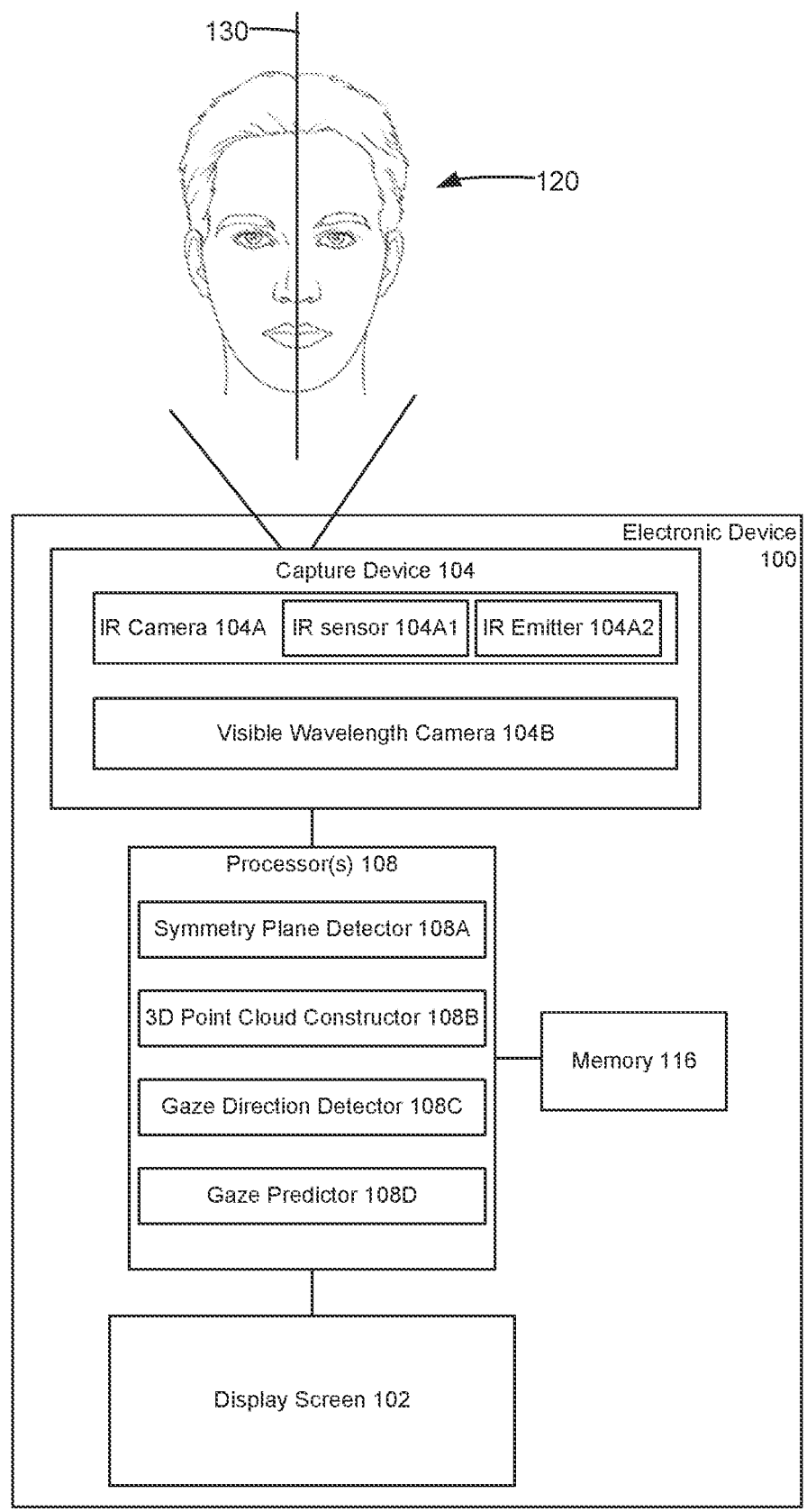
FIG. 1 is a diagram of an embodiment of an electronic device for eye gaze tracking.

The present disclosure will now be described with reference to the figures, which in general relate to an apparatus and method for image processing of bilaterally symmetrical objects. In some embodiments, a three-dimensional (3D) point cloud is constructed in order to assist with image processing of a bilaterally symmetrical object. The 3D point cloud may be generated based on infrared (IR) data captured by an IR camera. A two-dimensional (2D) visible wavelength image may also be used to assist in the image processing. For example, a 3D point cloud of a person's face and a 2D visible wavelength image of a person's face are combined in order to perform facial recognition or eye tracking.

One technical challenge is that the 3D point cloud might be "missing data" due to the person's face not being aligned straight into the IR camera. Also, depending on the environment in which the images were captured, the left and right side of the person's face can be very different in color, mostly because of the projected light on the face. In one embodiment, a "symmetry plane" of the person's face (or other bilaterally symmetrical object) is detected. Then, the 3D point cloud is reconstructed based on the symmetry plane. In one embodiment, data that is missing in a first portion of the 3D point cloud that corresponds to a first half of the bilaterally symmetrical object is filled in based on 3D point cloud data from a second portion of the 3D point cloud that corresponds to a second half of the bilaterally symmetrical object. In one embodiment, the symmetry plane is detected by solving (e.g., minimizing) a cost function. In one embodiment, a variational method is used to find symmetry plane. Techniques disclosed herein for locating the symmetry plane are computationally efficient. The symmetry plane may be detected without texture information, in an embodiment.

One technical challenge is efficiently determining an eye gaze of the person. In one embodiment, data is input into one or more long short-term memory (LSTM) cells in order to detect the direction of eye gaze. LSTM is a machine learning method that learns long-term dependences from a sequence of short-term data, in an embodiment. Note that long-term is relative to short-term. For example, long-term can be just a few seconds, or even shorter. A prediction of the next point of eye gaze is determined based on outputs of a sequence of LSTM cells, in an embodiment. This prediction is a next fixation in a sequence of saccade movements, in an embodiment.

In one embodiment, an LSTM cell is used to perform registration and/or transformation of input data in order to perform facial recognition and/or eye tracking. In some embodiments, LSTM cells are used to perform image registration and/or image transformation. As the term "image registration" is used herein, image registration is an image processing technique that looks for corresponding points in two data sets (such as two 3D point clouds). As the term "image transformation" is used herein, image transformation is an image processing technique that puts two data sets (such as two 3D point clouds) into one coordinate system. Image transformation measures differences between two data sets, in an embodiment. Thus, the term "image registration," as defined herein does not require that the two data sets be put into one coordinate system.

For example, an LSTM cell may be used to register the reconstructed 3D point cloud mentioned above to a standard 3D point cloud. The standard 3D point cloud is generated when the person is gazing at a known location (e.g., a point on a display screen), in an embodiment. For example, the LSTM cell may be used to determine corresponding points in the two 3D point clouds. As another example, the LSTM cell may be used to register the reconstructed 3D point cloud mentioned above to a standard 3D point cloud. For example, the LSTM cell may be used to measure differences between the aforementioned corresponding points in the two 3D point clouds. As another example, the LSTM cell may be used to register a 3D point cloud of a user's face from one time period to a 3D point cloud of the user's face from a previous time period. As still another example, the LSTM cell may be used to transform a 3D point cloud of a user's face from one time period to a 3D point cloud of the user's face from a previous time period. The various registrations and/or transformations may be used to perform eye tracking. Embodiments that use one or more LSTM cells that integrate both registration and transformation together to perform eye tracking are computationally efficient. Hence, time and, in some cases, battery power are saved.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 is a diagram of an embodiment of an electronic device 100 for eye gaze tracking. The electronic device 100 has an image capture device 104 that includes an infrared (IR) camera 104A and a visible wavelength camera 104B. The image capture device 104 is able to capture images of the person's head and/or face 120. The electronic device 100 also has a display screen 102, one or more processors 108, and memory 116. In one embodiment, the bilaterally symmetric object is a person's face. In one embodiment, the electronic device 100 is configured to perform facial recognition. In one embodiment, the electronic device 100 is configured to perform eye tracking. Note that there can be more than one infrared cameras and/or more than one visible wavelength cameras.

In one embodiment, the electronic device 100 is a wireless communication device. The electronic device 100 may for example be a mobile telephone, but may be other devices in further examples such as a desktop computer, laptop computer, tablet, hand-held computing device, automobile computing device and/or other computing devices.

The infrared (IR) camera 104A includes an image sensor 104A1 (e.g., CMOS image sensor, CCD sensor) that can be used to capture infrared data. The IR camera 104A also includes an IR emitter 104A2, which is able to emit IR light. The IR emitter 104A2 may be used to project IR light onto a person's face. In one embodiment, the infrared data is what is commonly referred to as "near infrared". Near infrared has a wavelength that is close to visible light. For example, the infrared (IR) camera 104A may be configured to capture electromagnetic radiation having a wavelength from about 700 nanometers (nm) to about 1400 nm. The IR data is not required to occupy the entire range from 700 to 1400 nm. The infrared (IR) camera 104A could sense some electromagnetic radiation having a wavelength below 700 nm or above 1400 nm. The infrared data may be used to produce depth images. In some embodiments, a 3D point cloud is generated from the infrared data. Numerous techniques may be used such as structured light and/or time-of-flight (TOF) sensors. The 3D point cloud can also be generated or enhanced by images from visible wavelength cameras.

The visible wavelength camera 104B includes an image sensor (e.g., CMOS image sensor, CCD sensor) that can be used to capture visible wavelength images. The visible wavelength images are digital images, in an embodiment. The visible wavelength camera 104B captures 2D visible wavelength images. The visible wavelength camera 104B captures 2D color (e.g., RGB) images, in an embodiment. The "visible wavelength" is also referred to as the "visible spectrum," and refers to the portion of the electromagnetic spectrum that is visible to the human eye. The visible wavelength camera 104B can sense electromagnetic radiation in a frequency range between about 380 nm to 740 nm, in an embodiment. The visible wavelength camera 104B is not required to sense electromagnetic radiation across the entire range of 380 nm to 740 nm. The visible wavelength camera 104B may in some cases be able to sense electromagnetic radiation below 380 nm or above 740 nm. It is possible that there is some overlap between the wavelength of the electromagnetic radiation captured by the IR camera 104A and the visible wavelength camera 104B. It is possible that there is a gap between the wavelength of the electromagnetic radiation captured by the IR camera 104A and the visible wavelength camera 1046.

The display screen 102 can be used as a user interface to visually display items (e.g., images, options, instructions, etc.) to a user. The display screen 102 can optionally accept inputs from a user. In one embodiment, display screen 102 is a touch screen display. In one embodiment, the electronic device 100 is configured to determine a location on display screen 102 at which the user is gazing.

The processor 108 is able to perform image processing of a bilaterally symmetric object, in an embodiment. The image processing may include, but is not limited to, facial recognition, eye tracking, and prediction of next point of eye gaze. The processor 108 can be used to control the various other elements of the electronic device 100, e.g., under control of software and/or firmware stored in the memory 116. It is also possible that there are multiple processors 108, e.g., a central processing unit (CPU) and a graphics processing unit (GPU). The processor(s) 108 can execute computer instructions (stored in a non-transitory computer-readable medium) to cause the processor(s) to perform steps used to implement the embodiments of the present technology described herein. The processor 108 is depicted as having several components (or modules) 108A, 108B, 108C, 108D. In one embodiment, each component is implemented by executing a set of instructions (which are accessed from memory 116) on the processor 108. The processor 108 may include a microprocessor, microcontroller, digital signal processor, field programmable gate array, or application specific integrated circuit.

The symmetry plane detector 108A module is configured to detect the symmetry plane of a bilaterally symmetrical object, such as a person's face. For example, the symmetry plane detector 108A could detect the symmetry plane 130 of the person's face 120, in FIG. 1. The bilaterally symmetrical object could be an inanimate object, such as a ball or drinking cup. In some embodiments, the symmetry plane detector 108A solves a cost function to detect the symmetry plane. The symmetry plane detector 108A uses both a 3D point cloud and an RGB 2D image of the bilaterally symmetrical object, in one embodiment. Techniques disclosed herein are very efficient computationally.

The 3D point cloud constructor 108B is configured to construct and reconstruct a 3D point cloud. The 3D point cloud comprises points in any 3D coordinate system. In one embodiment, the coordinate system is a Cartesian (x, y, z) coordinate system; however, another coordinate system could be used. Each point in the 3D point cloud comprises an intensity value, in an embodiment. In some embodiments, points in the 3D point cloud are assigned a color (e.g., RGB) value. The color assignment may be based on a 2D visible wavelength image. In some embodiments, the 3D point cloud comprises depth information. For example, the depth information may define a distance between a person (or part of the person) and the display screen 102 (or specific location on the display screen 102). Alternatively, the depth information may define a distance between the person (or part of the person) and the IR camera 104A. In some embodiments, the points in the 3D point cloud comprise voxels. In one embodiment, voxel is an (x, y, z, i), where "i" represents a monochromatic intensity. In one embodiment, voxel is an (x, y, z, r, g, b), where "r" is a red intensity, "g" is a green intensity, and "b" is a blue intensity. A different color scheme may be used. In some embodiments, the color information for the voxels is derived from the 2D visible wavelength image.

The 3D point cloud describes the bilaterally symmetrical object, in one embodiment. Initially, the description of the bilaterally symmetrical object may be incomplete due to limitations in IR data captured by the IR camera 104A. For example, a person may be looking to the right of the IR camera 104A, such that the IR camera 104A captures the left side of the person's face well, but does not capture much (if any) information about the right side of the person's face. For example, there might not be any depth information for substantial portions of the right side of the person's face. In one embodiment, the 3D point cloud is reconstructed based on the symmetry plane based on the symmetry plane. In one embodiment, data that is missing in a first portion of the 3D point cloud that corresponds to a first symmetrical half of the bilaterally symmetrical object is filled in based on data from a second portion of the 3D point cloud that corresponds to a second symmetrical half of the bilaterally symmetrical object. For example, missing 3D point cloud data for the left side of the person's face is filled in based on 3D point cloud data for the right side of the person's face.

The gaze direction detector 108C is configured to detect a direction of the person's gaze. In one embodiment, the gaze direction detector 108C inputs both the reconstructed 3D point cloud and a 2D color (e.g., RGB) image. Using both a 3D point cloud and a 2D color (e.g., RGB) image can detect the gaze direction more accurately than using only one of these inputs.

The gaze predictor 108D is configured to predict the next point of gaze of the person. In some embodiments, the gaze direction detector 108C and the gaze predictor 108D are implemented based on a long short-term memory (LSTM) model.

The memory 116 can be used to store software and/or firmware that controls the electronic device 100, as well to store images captured using the capture device 104, but is not limited thereto. Various different types of memory, including non-volatile and volatile memory can be used. The memory 116 can include a machine readable medium on which is stored one or more sets of executable instructions (e.g., apps) embodying one or more of the methodologies and/or functions described herein. The term "machine-readable medium" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium" or "computer-readable medium" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

Figure 2:
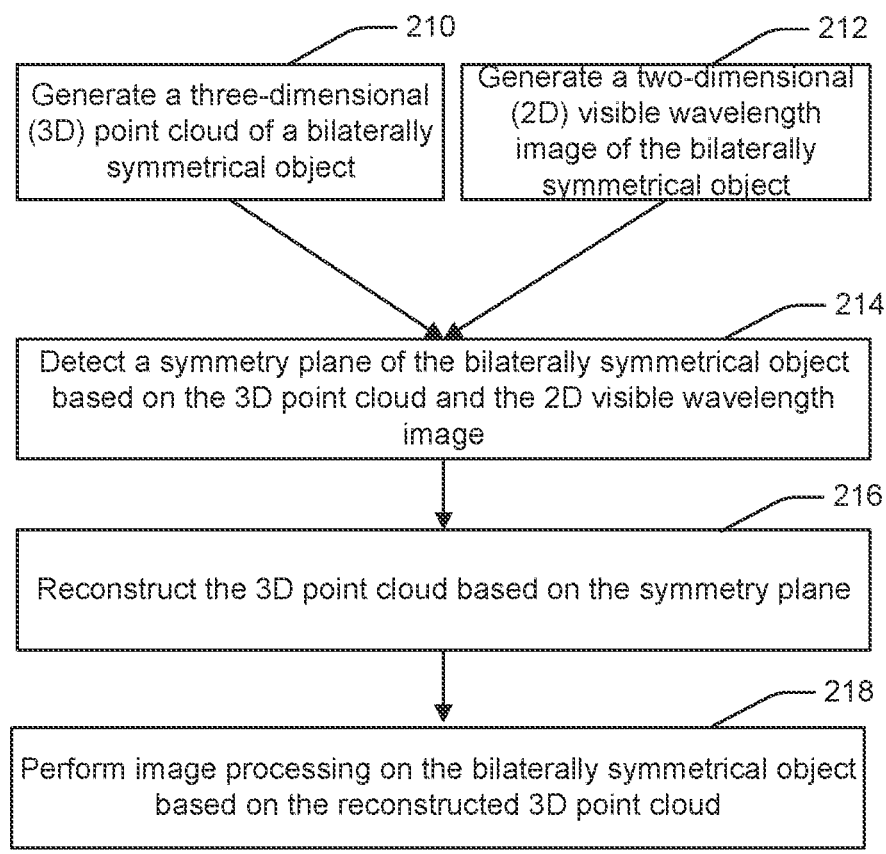
FIG. 2 is a flowchart of one embodiment of a process for performing image processing on a bilaterally symmetrical object.

FIG. 2 is a flowchart of one embodiment of a process 200 for performing image processing on a bilaterally symmetrical object. Process 200 is performed by electronic device 100, in an embodiment. In one embodiment, the bilaterally symmetrical object includes a person's face, and the image processing comprises eye gaze tracking.

Step 210 includes generating a 3D point cloud of a bilaterally symmetrical object. In one embodiment, the bilaterally symmetrical object is a person's face. In one embodiment, the bilaterally symmetrical object is the entire body of a person. In one embodiment, the bilaterally symmetrical object is an inanimate object, such as a ball or drinking cup. The 3D point cloud is generated from IR data from the IR camera 104A, in an embodiment. In one embodiment, the bilaterally symmetrical object comprises a person's face. In one embodiment, the bilaterally symmetrical object comprises a larger portion of a person, up to their entire body. The bilaterally symmetrical object could comprise a portion of the person's body other than their face.

Step 212 includes generating a two-dimensional (2D) visible wavelength image of the bilaterally symmetrical object. The 2D visible wavelength image is generated from visible wavelength data from the visible wavelength camera 104B, in an embodiment. The 2D image comprises a color (e.g., RGB) image, in an embodiment. The 2D image is a digital image, in an embodiment. Steps 210 and 212 can be performed either sequentially or in parallel. When performed sequentially, either step can be performed first.

Step 214 includes detecting a symmetry plane of the bilaterally symmetrical object based on the 3D point cloud and the 2D visible wavelength image. In one embodiment, the symmetry plane is a sagittal plane of a person. In one embodiment, the symmetry plane is a sagittal plane of a person's face. In one embodiment, the 2D visible wavelength image is used to locate the bilaterally symmetrical object. For example, a person's face can be extracted from the 2D visible wavelength image. Then, the bilaterally symmetrical object can be located in the 3D point cloud, based on a mapping of the 2D visible wavelength image to the 3D point cloud.

Step 216 includes reconstructing the 3D point cloud based on the symmetry plane. Step 216 includes, filling in data that is missing in a first portion of the 3D point cloud that corresponds to a first symmetrical half of the bilaterally symmetrical object based on 3D point cloud data from a second portion of the 3D point cloud that corresponds to a second symmetrical half of the bilaterally symmetrical object, in one embodiment. Note that each point in the 3D point cloud is assigned a color (e.g., RGB) value from the 2D visible wavelength image, in an embodiment.

Step 218 includes performing image processing of the bilaterally symmetrical object based on the reconstructed 3D point cloud. Step 218 includes performing facial recognition, in an embodiment. For example, step 218 might include determining whether a person operating a smart phone, is the owner of the smart phone. Step 218 can also be used to distinguish between a person who is using the electronic device 100 and a bystander who happens to be within the range of the capture device 104. Step 218 includes performing eye tracking, in an embodiment.

Step 218 includes performing registration of the reconstructed 3D point cloud of the bilaterally symmetrical object to another 3D point cloud of the bilaterally symmetrical object using a long short-term memory (LSTM) cell, in an embodiment. Step 218 includes performing transformation of the reconstructed 3D point cloud of the bilaterally symmetrical object to another 3D point cloud of the bilaterally symmetrical object using a long short-term memory (LSTM) cell. Step 218 includes determining corresponding pairs of points between the reconstructed 3D point cloud of the bilaterally symmetrical object and another 3D point cloud of the bilaterally symmetrical object using a long short-term memory (LSTM) cell, and measuring differences between the corresponding pairs of points using the long short-term memory (LSTM) cell, in an embodiment. Further details of image processing using an LSTM cell are discussed below.

Figure 3:
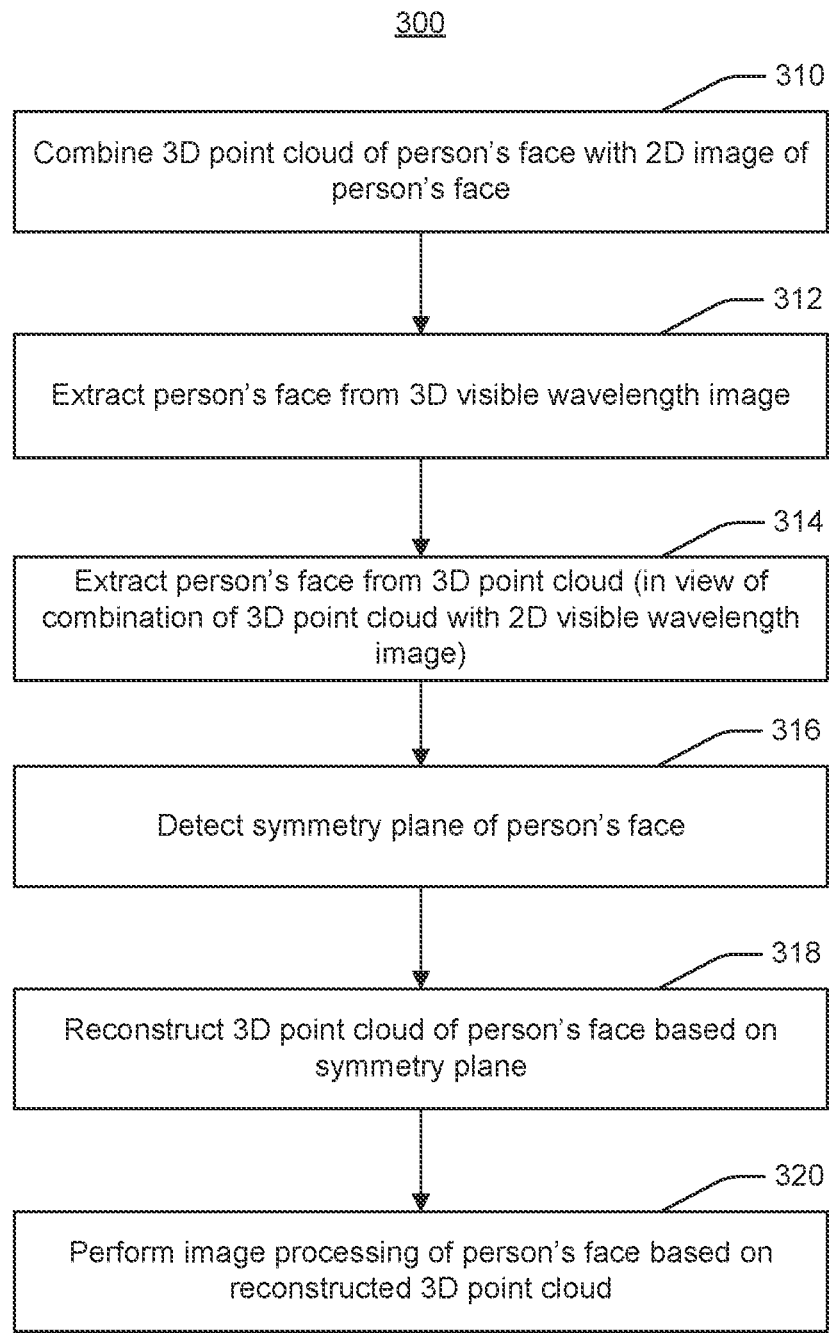
FIG. 3 is a flowchart of one embodiment of a process for performing image processing on a person's face based on a reconstructed 3D point cloud.

FIG. 3 is a flowchart of one embodiment of a process 300 for performing image processing on a person's face based on a reconstructed 3D point cloud. In one embodiment, image processing comprises eye gaze tracking. Process 300 is performed by electronic device 100, in an embodiment. Process 300 describes further details of one embodiment of process 200.

Step 310 includes combining a 3D point cloud of a person's face with a 2D visible wavelength image of the face. The 3D point cloud is a set of 3D data points that contain details of a person's face, in one embodiment. Step 310 includes mapping RGB data from the 2D visible wavelength image to points in the 3D point cloud, in an embodiment. Thus, each point in the 3D point cloud is assigned a color (e.g., RGB value), in an embodiment. Combining the 3D point cloud with the color data can lead to better image processing of the bilateral object. For example, the color data can make gaze detection more accurate.

Step 312 includes extracting the person's face from the 2D visible wavelength image. The 2D visible wavelength image of the face contains eye images, in an embodiment. The eye images may include corneal reflection images of bright pupil or dark pupil, as well as eye images in color. Numerous techniques are known to those of ordinary skill for extracting a person's face from a 2D visible wavelength image.

Step 314 includes extracting the person's face from the 3D point cloud. The extraction is based on the mapping of the 2D image to the 3D point cloud, in one embodiment. In other words, once the mapping is known, along with the face extraction of step 314, the person's face may be extracted from the 3D point cloud.

Step 316 includes detecting a symmetry plane of the person's face. The symmetry plane of the person's face may also be referred to as a sagittal plane of the person's face. Further details of detecting a symmetry plane are described below. In some embodiments, a cost function is solved in order to detect the symmetry plane. Solving a cost function is an accurate and efficient technique to detect the symmetry plane.

Step 318 includes reconstructing the 3D point cloud based on the symmetry plane. Step 318 includes, filling in data that is missing in a first portion of the 3D point cloud that corresponds to a first half of the person's face based on 3D point cloud data from a second portion of the 3D point cloud that corresponds to a second half of the person's face, in one embodiment.

Step 320 includes performing image processing of the person's face based on the reconstructed 3D point cloud. Note that points in the reconstructed 3D point cloud are assigned color (e.g., RGB) values from the 2D visible wavelength image, in an embodiment. Step 320 includes performing facial recognition, in an embodiment. For example, step 320 might include determining whether a person operating a smart phone, is the owner of the smart phone. Step 320 includes performing eye tracking, in an embodiment. Step 320 includes performing image processing using LSTM cells, in an embodiment. In some embodiments, the 3D point cloud can be used to detect head movement, and the 2D visible wavelength image can be used for eye detection. The head and eye movement can be very subtle in gaze detection. The further the distance between user and the cameras, the more subtle the changes. Combining information from both the 3D point cloud and eye images (from 2D visible wavelength image) provides more details for gaze detection and leads to better results.

Following are details of one embodiment of detecting a symmetry plane, such as a sagittal plane. Detecting the symmetry plane can be quite difficult. One factor in the difficulty is that the 3D point cloud may be missing data on one half due to, for example, the person not looking directly into the IR camera 104A. In one embodiment, the symmetry plane is detected based on variational functions, as described below. Let $p=(x, y, z)$ be a point in a 3D point cloud. A function "g" is used to present the sagittal plane with $g(p)=0$, which separates the left and right of sides of the person's face. Equation 1 describes the sagittal plane, Equation 2 is for the left half of the person's face, and Equation 3 is for the right half of the person's face.

$$g(x,y,z)=0 \qquad \text{Equation 1}$$

$$g(x,y,z)>0 \qquad \text{Equation 2}$$

$$g(x,y,z)<0 \qquad \text{Equation 3}$$

In addition, let p' be symmetric to p with respect to sagittal plane. That is, the line formed by p and p' is perpendicular to g. Because of symmetry, the distance of p to g should be equal to the distance of p' to g. That is, their difference should be 0. When g is the sagittal plane, the cost function in Equation 1 below will be minimized. Note that a person's face may not be perfectly symmetric; therefore, the cost function is not required to be zero. If the person's face is perfectly symmetric then the cost function can be minimized to zero.

$$\mathcal{F}(g) = \int_n^\square \lambda_1(D(p)K(g(x,y,z))-D(p')(1-K(g(x,y,z))))^2 + \lambda_2 D(p')(1-K(g(x,y,z)))-D(p')(K(f(x,y,z)))^2 dxdydz \quad \text{Equation 4}$$

In Equation 1, $\lambda_1$ and $\lambda_2$ are parameters related to the left and right side of the bilaterally symmetric object (e.g., left and right side of the person's face). In one embodiment, $\lambda_1$ is equal to $\lambda_2$. Using different values for $\lambda_1$ and $\lambda_2$ gives more weight to one side of the bilaterally symmetric object. In Equation 4, K(g) is the Heaviside function, which is represented below in Equation 5.

$$K(g) = \begin{cases} 0, & g < 0 \\ 1, & g \geq 0 \end{cases} \quad \text{Equation 5}$$

Note, the number of points in the right side may not be the same as the number of points in the left side, such that there might not be a p' for each p. For the purpose of simplicity, Equation 4 is re-written as shown in Equations 6, 7, and 8.

$$\mathcal{F}(g) = \int_n^\square \lambda_1(DK-(1-K))^2 + \lambda_2(D(1-K)-D'K)^2 dxdydz \quad \text{Equation 6}$$

$$\mathcal{F}(g) = \int_n^\square \lambda_1(DK-D'+D'K)^2 + \lambda_2(D-DK-D'K)^2 dxdydz \quad \text{Equation 7}$$

$$\mathcal{F}(g) = \int_n^\square (D^2K^2+D'^2+D'^2K^2-2DD'K+2DD'K^2-2D'^2K)+\lambda_2(D^2+D^2K^2D'^2K^2-2D^2K-2DD'K+2DD'K^2)dxdydz \quad \text{Equation 8}$$

In Equations 6, 7, and 8, D, D', and K represent D(p), D(p') and K(g(x, y, z)) in Equation 4, respectively. As noted above, in one embodiment, $\lambda_1$ is equal to $\lambda_2$. If $\lambda_1$ is equal to $\lambda_2$, then Equation 8 can be simplified as indicated in Equation 9.

$$\mathcal{F}(g) = \int_n^\square D^2+D'^2+2(D+D')^2(K^2-K)dxdydz \quad \text{Equation 9}$$

Next, let E be equal to $[D^2+D'^2+2(D+D')^2(K^2-K)]$, keep D and D' fixed, and deduce the associated Euler-Lagrange equation for g. Then, solve for g and parameterize with step size t, as indicated in Equation 10.

$$\frac{\partial g}{\partial t} = 2\delta(g(x, y, z))((D + D')^2(2K - 1)) \quad \text{Equation 10}$$

$$g^n = g^{(n-1)} + 2\Delta t \delta(g(x, y, z))((D + D')^2(2K - 1)) \quad \text{Equation 11}$$

In Equation 11, $\Delta t$ is a step size. Also, in Equation 11, the following substitution may be made, as in Equation 12.

$$\delta(g(x, y, z)) = \frac{d}{dg}K(g) \quad \text{Equation 12}$$

Given that not every point p has a symmetric point p' that can form a line perpendicular to f, the definition of p' is relaxed (or loosened)) to the closest ideal point of p' within distance d, where d is a parameter based on how relaxed the definition of p' is desired to be. In addition, using the points on g(x, y, z), the sagittal plane is obtained by Support Vector Machine (SVM), and g(x, y, z)=Ax+By+Cz+D, where A, B, C, D are parameters. Thus, the distance D(p) between p and g can be obtained as indicated in Equation 13.

$$D(p) = \frac{Ax + By + Cz + D}{\sqrt{A^2 + B^2 + C^2}} \quad \text{Equation 13}$$

The initial symmetry plane can be a plane perpendicular to the line between the two eyes, in one embodiment, which can be approximately detected in the 2D visible wavelength images. In one embodiment, the step size is set to 1, and the Heaviside Function is given by Equation 14.

$$K(z) = \frac{1}{2}\left(1 + \frac{2}{\pi}\arctan\left(\frac{z}{\varepsilon}\right)\right) \quad \text{Equation 14}$$

Once the symmetry plane (e.g., sagittal plane) is determined, the reconstructed 3D point cloud for the user's face can be made symmetrically, based on the sagittal plane. In one embodiment, data that is missing in a first portion of the 3D point cloud that corresponds to a first symmetrical half of the bilaterally symmetrical object is filled in based on 3D point cloud data from a second portion of the 3D point cloud that corresponds to a second symmetrical half of the bilaterally symmetrical object. Embodiments of the technique for finding the symmetry plane are computationally efficient. Hence, computing time and power can be saved. Also, in the event that the techniques are employed in a battery powered device, battery power can be saved.

Figure 4:
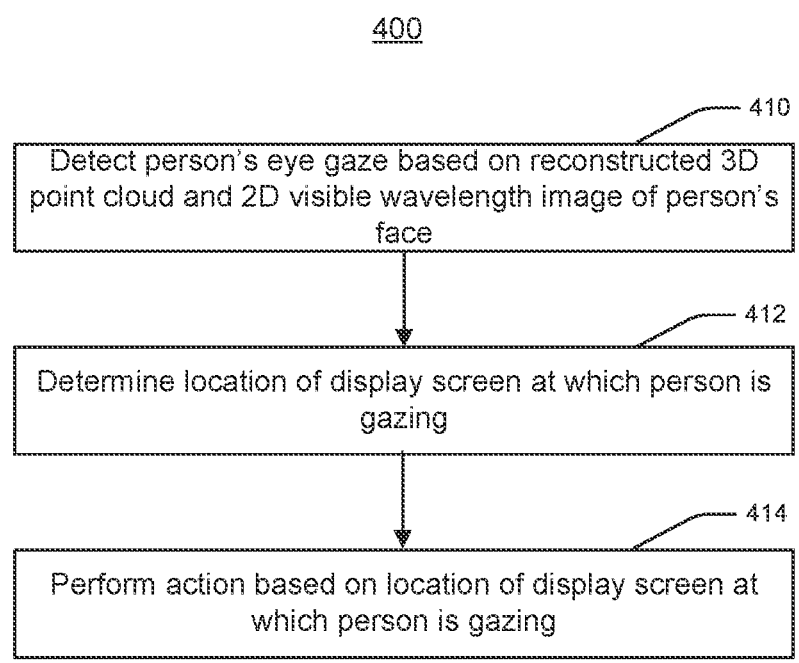
FIG. 4 is a flowchart of one embodiment of a process of performing an action based on a location of a display screen at which a person is gazing.

FIG. 4 is a flowchart of one embodiment of a process 400 of performing an action based on a location of a display screen at which a person is gazing. Process 400 may be formed by electronic device 100, UE 110, but is not limited thereto.

Step 410 includes detecting a person's eye gaze based on a reconstructed 3D point cloud and a 2D visible wavelength image of the person's face. In step 410, the 2D visible wavelength image may be used to detect the person's eyes, and the 3D point cloud can be used to determine the person's head position. Step 412 includes determining a location on a display screen 102 at which the person is gazing. Steps 410 and 412 may be performed in one embodiment of step 218 of process 200 or step 320 of process 300.

Step 414 includes performing an action based on the location at which the person is gazing. Example actions include, but are not limited to, highlighting an item on the display screen, turning to a next page in a document being presented on the display, scrolling up or down in a document being presented on the display.

Figure 5:
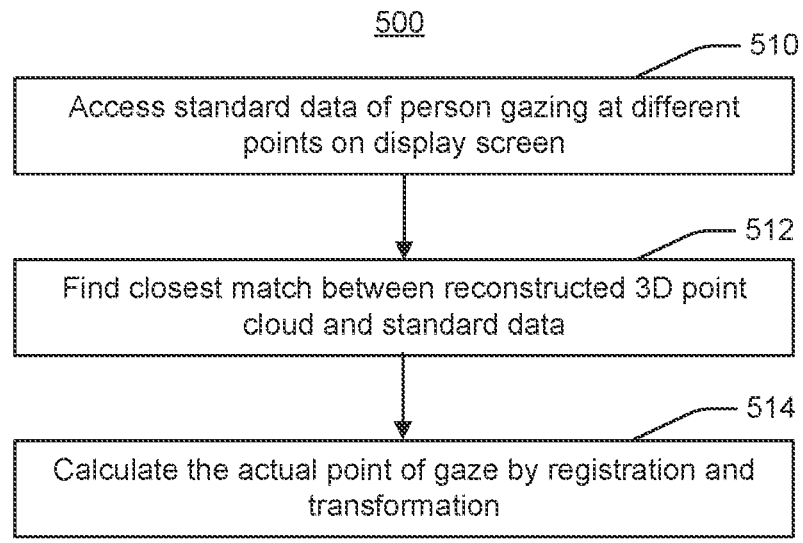
FIG. 5 is a flowchart of one embodiment of a process of determining a location on a display screen at which a person is gazing.
Figure 7:
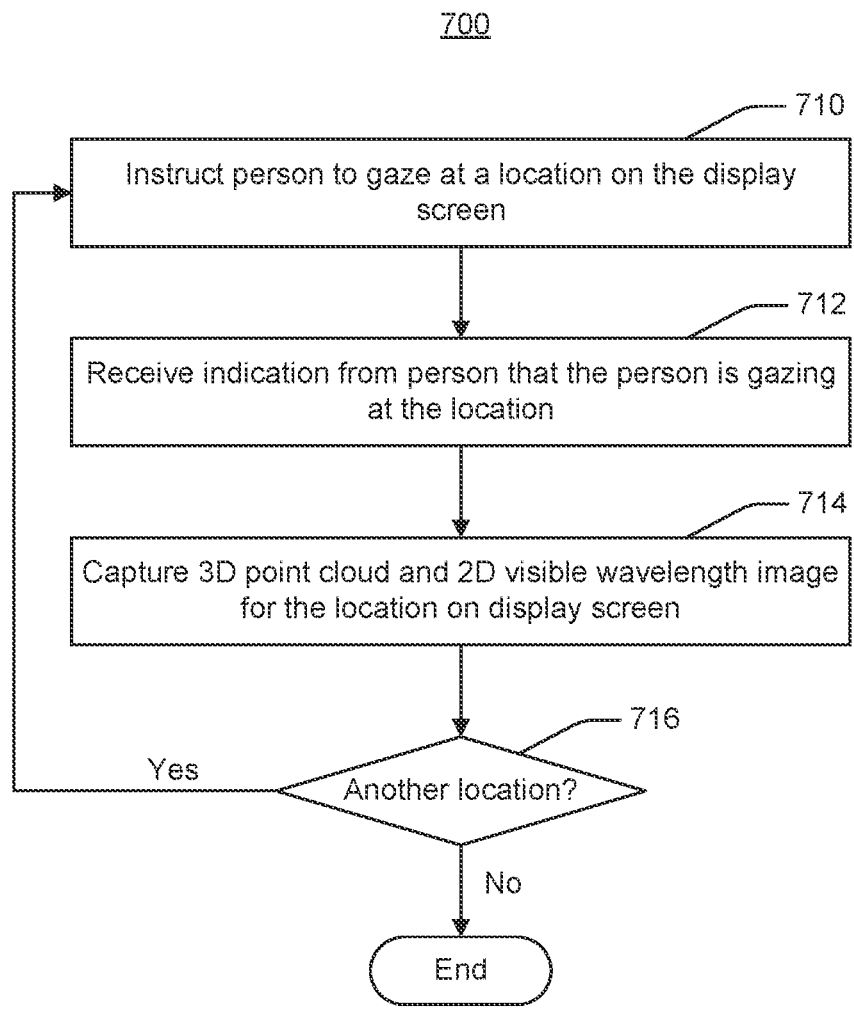
FIG. 7 is a flowchart of an embodiment of determining standard data, which may be used in process.

FIG. 5 is a flowchart of one embodiment of a process 500 of determining a location on a display screen at which a person is gazing. Process 500 may be formed by electronic device 100, UE 110, but is not limited thereto. Prior to process 500 what is referred to as "standard data" is collected. The standard data used in process 500 includes a number of 3D point clouds. However, the standard data is not limited to 3D point clouds. Each of the 3D point clouds is collected with the user gazing at a specific location on the display screen 102, in an embodiment. This enables the electronic device 100 to learn what the 3D point cloud will look like when the user is gazing at certain points on the display screen 102. FIG. 7 describes further details of one embodiment of collecting standard data.

Step 510 includes accessing the standard data, which includes 3D point clouds collected when the user was gazing at different points on the display screen 102.

Figure 9:
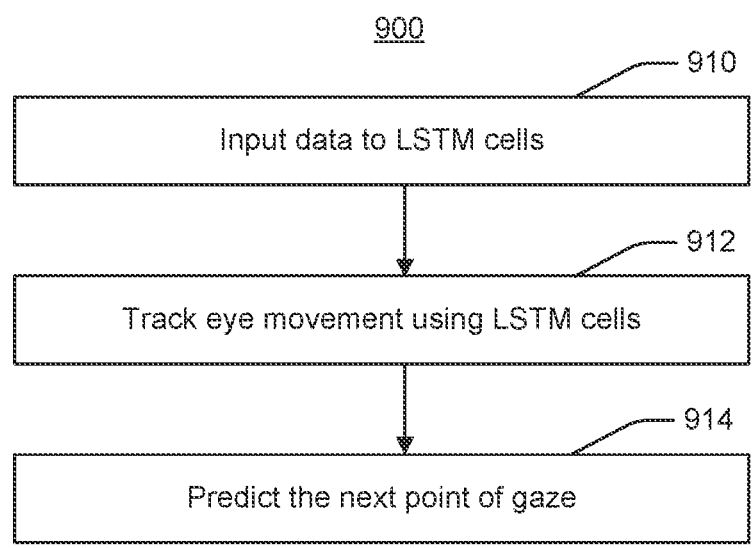
FIG. 9 is a flowchart of one embodiment of a process of predicting a next point of eye gaze by using LSTM cells.

Step 512 includes finding the closest match between the reconstructed 3D point cloud and the standard data. Thus, step 512 in effect determines the closest point of gaze in the standard data to the person's present point of gaze. Step 514 includes calculating the actual (present) point of gaze by registration and transformation. In one embodiment, LSTM cells are used to perform the registration and/or transformation. FIG. 9 shows details of one embodiment of image registration and image transformation.

Figure 6:
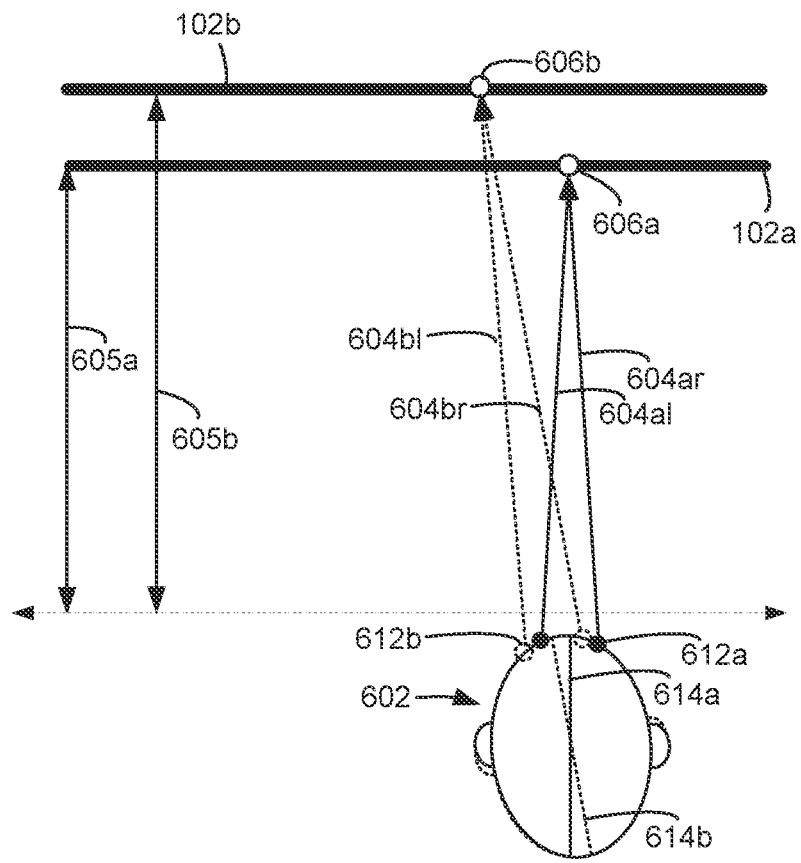
FIG. 6 shows a person's head and various geometric details at two points in time.

FIG. 6 shows a person's head and various geometric details at two points in time. One point in time is when the standard data was collected. The other point in time is when the location on the display screen at which the person is gazing is being detected based on the standard data (as in process 500). The reference numerals that end in the letter "a" correlate to the time is when the standard data was collected. The reference numerals that end in the letter "b" correlate to the time when the location on the display screen at which the person is gazing is being detected based on the standard data. Note that the person's face is an example of a bilaterally symmetrical object.

FIG. 6 shows a head 602 of a person who is gazing at a display screen 102. The display screen 102 is depicted at two points in time. Display screen 102a represents the display screen during a time when the standard data is collected. Display screen 102b represents the display screen when the person's gaze is being detected. The person's eye gaze is directed at location 606a on the display screen 102a. Line 604a1 and line 604ar show the direction of the gaze from the person's eyes 612a. More specifically, line 604a1 corresponds to the left eye, and line 604ar corresponds to the right eye. Line 614a indicates the orientation of the person's head when gazing at point 606a. Line 614a corresponds to the sagittal plane, in one embodiment. Line 605a shows the distance between the person and the display screen 102a. The standard data includes a 3D point cloud, which is based on IR data captured when the person was gazing at location 606a, from a distance given by line 605a.

FIG. 6 also shows the head 602 of the person who is gazing at a display screen 102b when the location on the display screen at which the person is gazing is being detected. The person's eye gaze is directed at location 606b on the display screen 102b. Lines 604bl, and 604br show the direction of the gaze from the person's eyes 612b, which are depicted in dashed lines. More specifically, line 604bl corresponds to the left eye, and line 604br corresponds to the right eye. Line 614b indicates the orientation of the person's head when gazing at point 606b. Line 614b corresponds to the sagittal plane, in one embodiment. Line 605b shows the distance between the person and the display screen 102b.

The present data includes a 3D point cloud, which is based on IR data captured when the person was gazing at location 606b, from a distance given by lines 604b. If line 604b1 and line 604br are not of the same length, the average distance may be taken. As noted in the discussion of step 512, the standard data is examined to find a 3D point cloud that is closest to the present 3D point cloud. Step 514 involves performing registration and transformation of these two 3D point clouds. Performing registration and transformation will indicate the difference between the two 3D point clouds. Thus, these differences will indicate the difference (if any) in the distance between the person and the display screen. These differences will also indicate the difference in the person's head angle, in an embodiment. From this information the location 606b on the display screen 102b can be determined.

FIG. 7 is a flowchart of an embodiment of determining standard data, which may be used in process 500. Step 710 includes instructing a person to gaze at a point on the display screen 102. Step 710 may include highlighting a location of the display screen 102 and providing an audio or visual instruction to gaze at the location.

Step 712 includes receiving an indication from the person that the person is gazing at the location. The input from the user could be voice, touching the display screen, making a selection with an input device (e.g., mouse), striking a key on a keypad, etc.

Step 714 includes capturing a 3D point cloud for the location on the display screen 102. Step 714 may include the IR camera 74A capturing IR data. Step 714 also includes capturing 2D visible wavelength images.

Step 716 is determination of whether there are other locations on the display screen 102 for which to collect 3D point cloud data. In one embodiment, data is collected for about five locations. For example, a 3D point cloud could be generated for each of four corners and a center of the display screen 102. The process 700 returns to step 710 if there is more data to collect. In one embodiment, data is collected for about nine locations. For example, a 3D point cloud could be generated for each of four corners, a center of the display screen 102, as well as the mid-points along each of the four edges of the display screen 102. The sets of 3D point clouds may be stored in memory 116. The sets of 3D point clouds are stored in non-volatile memory, in an embodiment. However, it is not required that the 3D point clouds be stored on the electronic device 70.

Figure 8:
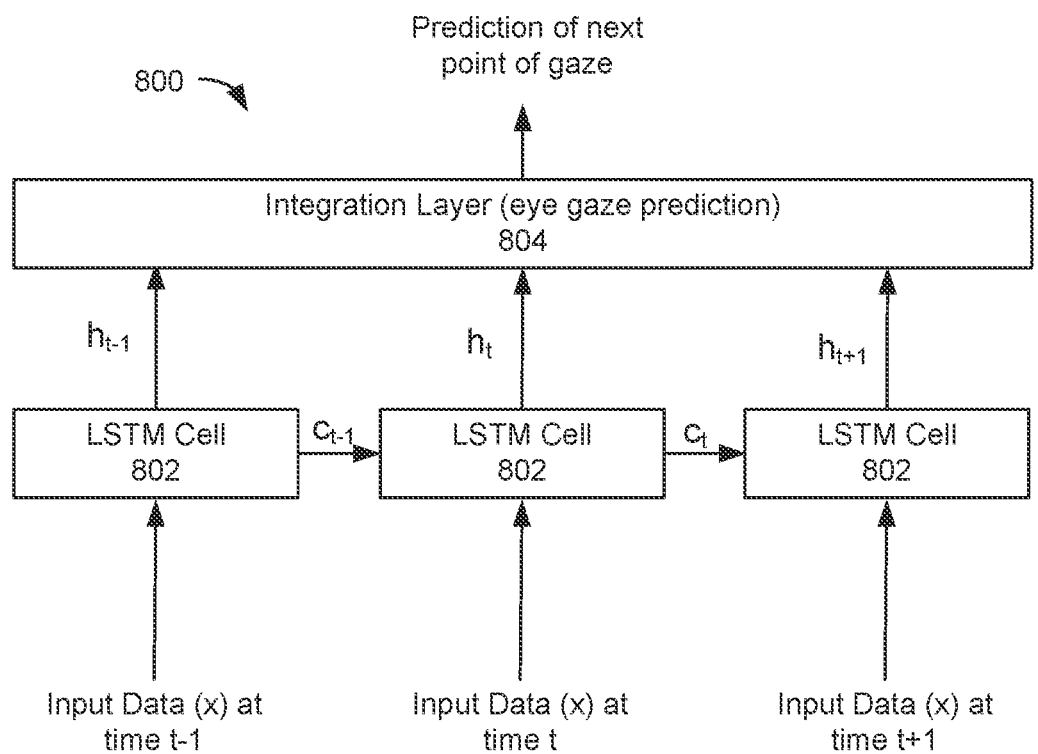
FIG. 8 depicts an embodiment of a system that is configured to perform eye gaze detection.

FIG. 8 depicts an embodiment of a system 800 that is configured to perform eye gaze detection. The system 800 is used to track the eye gaze over time, and to predict a next point of eye gaze, in one embodiment. The system 800 is used to implement gaze direction detector 108C and gaze predictor 108D, in one embodiment.

Thus, system 800 may be implemented in electronic device 100. The system 800 may be implemented in UE 80. In one embodiment, system 800 is implemented by executing instructions on processor 108.

The system 800 includes several long short-term memory (LSTM) cells 802. In this embodiment, three LSTM cells 802 are depicted. The system 800 may have more or fewer than three LSTM cells 802. Each LSTM cell 802 inputs data (x) for a point in time. The data that is input is for a different time point for each of the LSTM cells 802. In this example, the time periods are referred to as "t+1", "t", and "t−1". The input data may include the reconstructed 3D point cloud. The 2D visible wavelength image data may also be input to the LSTM cells 802. In one embodiment, the 2D visible wavelength image data is used to assign color (e.g., RGB) values to the 3D point cloud, in which case the 2D visible wavelength image is not necessarily as separate input. Standard 3D point cloud data, such as collected in process 700, may also be input to the LSTM cells 802. Note that while in some embodiments, the system inputs reconstructed 3D point clouds (such as generated in process 200 or 300), it is not required that the 3D point clouds input to system 800 be reconstructed 3D point clouds. In other words, the 3D point clouds that are input to system 800 may be generated in any suitable manner.

An LSTM cell 802 may output information to another LSTM cell 802. In one embodiment, an LSTM cell 802 outputs a location of the focus point of the person's eye gaze for a point in time to another LSTM cell 802. The location is described by a vector $(c_t)$, in one embodiment. The LSTM cell 802 that receives this information may modify the location of the focus point or, in some cases, make no change to the location of the focus point. Note that additional information may be exchanged between the LSTM cells 802, as described more fully below.

Each LSTM cell 802 has an input gate, an output gate, and a forget gate, in an embodiment. These three gates may compute their respective outputs based on both a present time step (e.g., t) and a previous time step (e.g., t−1). In some embodiments, various weights can be applied to the gates to impact how that gate contributes to the final output of the LSTM cell 802. Further details of one embodiment of the LSTM cells 802 are described in connection with FIG. 10. Each LSTM cell 802 provides an output $h_t$ to the integration layer 804. An LSTM cell 802 may provide an output $c_t$ as an input to another LSTM cell 802.

The integration layer 804 receives an input ($h_t$) from each LSTM cell 802. The input ($h_t$) is a vector that describes the direction of the person's eye gaze, in one embodiment. The combination of input $h_t$ and vector $c_t$ may be passed on to the next LSTM cell 802, in an embodiment. The integration layer 804 outputs the present location of the person's eye gaze, in an embodiment. The integration layer 804 outputs the location on the display screen 102 at which the person is presently gazing, in one embodiment. The integration layer 804 predicts a next point of the person's eye gaze, in one embodiment. In one embodiment, the integration layer 804 predicts a next fixation point in a series of saccade motions.

FIG. 9 is a flowchart of one embodiment of a process 900 of predicting a next point of eye gaze by using LSTM cells 802. The process 900 may be used in the system 800 in FIG. 8. Step 910 includes inputting data to LSTM cells 802. The input data may include the reconstructed 3D point cloud for a point in time. The input data may include the standard 3D point clouds. The input data may include the 2D visual wavelength image data for a point in time. Each LSTM cell 802 inputs data for a different point in time, in one embodiment. Collectively, the LSTM cells 802 input data for a sequence of time points, in an embodiment.

Step 912 includes tracking eye movement using the LSTM cells 802. In one embodiment, each LSTM cell 802 determines a point of gaze for a point in time. In one embodiment, step 912 includes performing registration of the reconstructed 3D point cloud to another 3D point cloud using an LSTM cell. In one embodiment, step 912 includes performing transformation of the reconstructed 3D point cloud to another 3D point cloud using an LSTM cell. Further details of how the LSTM cells may be used to track eye movement are discussed below.

Step 914 includes predicting a next point of eye gaze. Step 914 may be performed by the integration layer 804. The integration layer 804 inputs vectors from the LSTM cells 802, which describe the direction of the user's eye gaze for different points in time. Based on these vectors, the integration layer 804 predicts a next point of gaze, in an embodiment.

Figure 10:
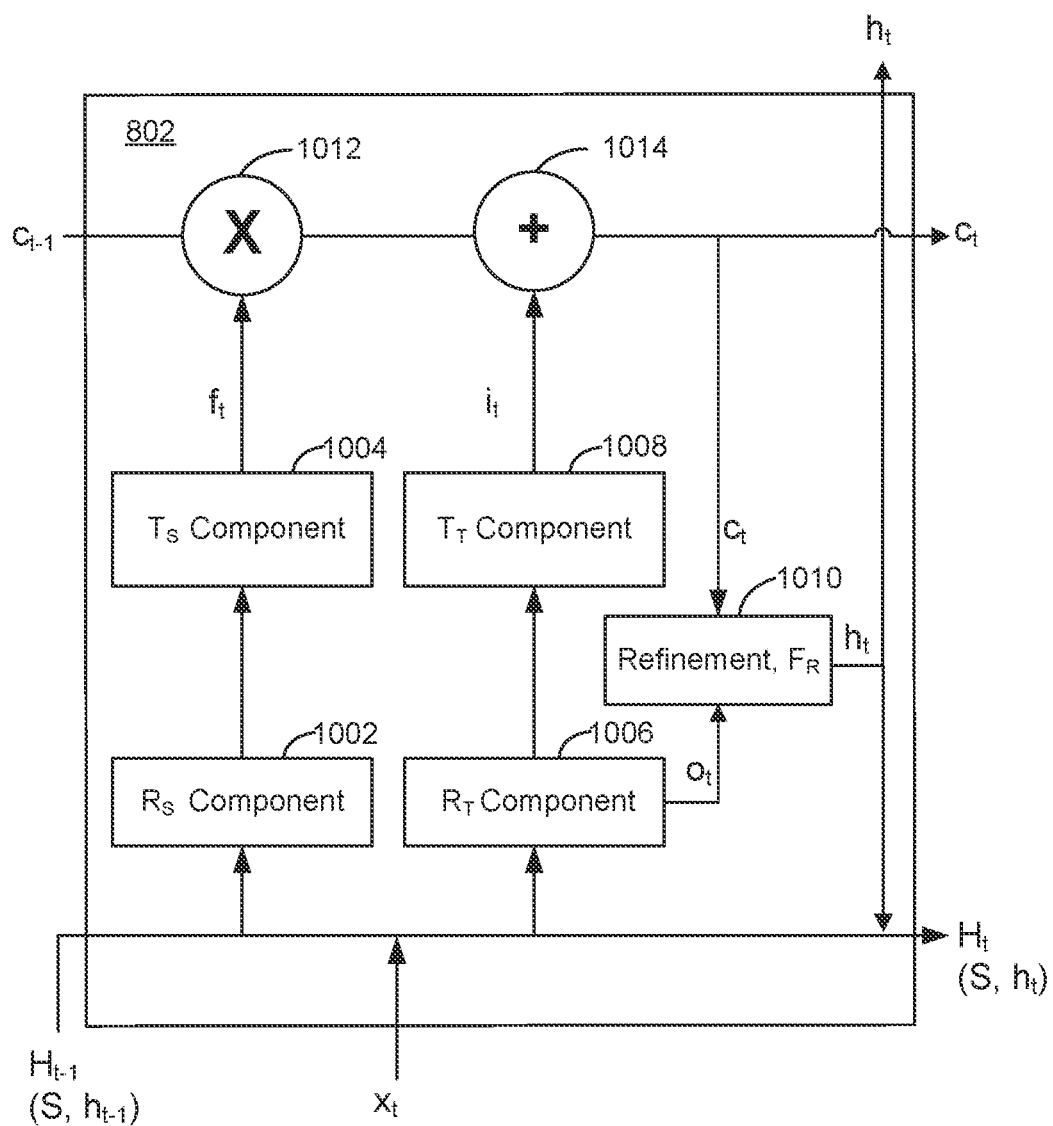
FIG. 10 depicts one embodiment of an LSTM cell.

FIG. 10 depicts one embodiment of an LSTM cell 802. The LSTM cell 802 has an $R_s$ component 1002 that is configured to perform registration of a 3D point cloud with standard data for the 3D point cloud. For example, the $R_s$ component 1002 may be configured to look for corresponding points in the reconstructed 3D point cloud with standard data for the 3D point cloud. The LSTM cell 802 has a $T_s$ component 1004 that is configured to perform transformation of the reconstructed 3D point cloud with standard data for the 3D point cloud. For example, the $T_s$ component 1004 may be configured measure differences between the aforementioned corresponding points. The reconstructed 3D point cloud may be provided by performing process 200 or process 300, but is not limited thereto.

The LSTM cell 802 has an $R_T$ component 1006 that is configured to perform registration of the 3D point cloud (for a present time, t) with the 3D point cloud for a previous time (t−1). For example, the $R_T$ component 1006 may be configured to look for corresponding points in the two 3D point clouds. The LSTM cell 802 has a $T_T$ component 1008 that is configured to perform transformation of the 3D point cloud with the 3D point cloud for a previous time (t−1). For example, the $T_T$ component 1008 may be configured measure differences between the aforementioned corresponding points in the two 3D point clouds.

Registration in an embodiment of an LSTM cell 802 looks for relationship between two datasets. For example, registration looks for corresponding points in two datasets (such as two 3D point clouds). Transformation in an embodiment of an LSTM cell 802 quantitatively transforms a dataset from one coordinate system to another. For example, transformation measures the differences between two datasets (such as two 3D point clouds). There may be some overlap between registration and transformation. Thus, in some embodiments, rather than performing registration and transformation separately, registration and transformation may be performed together in, for example, a single step.

The input ($x_t$) refers to the input data to the LSTM cell 802 at a time "t". The input data may include the reconstructed 3D point cloud, as well as the 2D visible wavelength data mapped to the 3D point cloud. For example, points in the 3D point cloud may have RGB intensity values assigned to them. The reconstructed 3D point cloud is generated using process 200, in one embodiment. The reconstructed 3D point cloud is generated using process 300, in one embodiment.

The LSTM cell 802 inputs a location of focus ($c_{t-1}$) for a previous time period from another LSTM cell 802, and outputs a location of focus ($c_t$) for a current time period to another LSTM cell 802. The input location of focus ($c_{t-1}$), which may be received from another LSTM cell 802, is modified by the outputs of the $T_s$ component 1004 and the $T_T$ component 1008, before being output to the next LSTM cell 802.

The location of focus ($c_t$) comprises a cell state vector, in one embodiment. In one embodiment, the cell state vector indicates a standard point of gaze $P_s$ and a current point of gaze Pt at time t. The current point of gaze Pt indicates where the user is looking at on the display screen 102, which may be obtained by combining the previous point of gaze and a movement in the eye gaze. The cell state vector is represented as a 2 by 2 matrix, in one embodiment. Each row represents an (x, y) coordinate on the display screen 102, in one embodiment. Thus, one row represents an (x, y) coordinate for the standard point of gaze ($P_s$), and the other row represents an (x, y) coordinate for the current point of gaze Pt, in one embodiment.

The LSTM cell 802 inputs a hidden variable ($H_{t-1}$) for a previous time period from another LSTM cell 802, and outputs a hidden variable ($H_t$) for a current time period to another LSTM cell 802. Thus, $H_t$ is passed from one LSTM cell to another. In one embodiment, $H_t=\{S, h_t\}$, where S is the standard face data. The standard face data may be collected using process 700, for example. The LSTM cell 802 outputs ($h_t$), which is provided to the integration layer 804, in one embodiment. Further details of generating $h_t$ are described below.

Collectively, the $R_s$ component 1002 and the $T_s$ component 1004 produce a "forget gate" result for a point in time ($f_t$). In one embodiment, the $R_s$ component 1002 looks for the 3D point cloud in the standard data that is the closest to the 3D point cloud. The $R_s$ component 1002 provides the $T_s$ component 1004 with pairs of points, each pair being corresponding points in the two 3D point clouds, in an embodiment. In one embodiment, the $R_s$ component 1002 performs registration of S and $x_t$. Recall that S is the standard face data, and $x_t$ is the input data. In other words, the $R_s$ component 1002 may determine pairs of corresponding points in S and $x_t$.

Based on the corresponding points from the $R_s$ component 1002, the $T_s$ component 1004 performs transformation of S and $x_t$, which determines differences between S and $x_t$, in one embodiment. The $T_s$ component 1004 compares the two 3D point clouds (for S and $x_t$) and determines whether the person's face is an authorized user, in one embodiment. If this is not an authorized user, then the forget gate output is zero, in one embodiment. If this is an authorized user, then the forget gate output is one, in one embodiment. Based on the corresponding points, the $T_s$ component 1004 may also make an estimate of distance that the face has moved (relative to the standard data). The $T_s$ component 1004 may also make an estimate of location on the display screen on which the person is gazing.

The $T_s$ component 1004 outputs $f_t$. Equation 14 describes how the $R_s$ component 1002 and the $T_s$ component 1004 may generate $f_t$.

$$f_t = \sigma_f(W_f T_s(R_s(X_t, H_{t-1}))) \qquad \text{Equation 14}$$

Equation 14, $R_s$ is the registration of S and $X_t$, which provides pairs of corresponding points between the standard data S and the current input data $X_t$. In Equation 14, $T_s$ is the transformation of S and $X_t$, which provides the movement between these two data sets. Note that S may be provided as part of the input $H_{t-1}$. In Equation 14, $\sigma_f$ is a Heaviside function, in an embodiment. In Equation 14, $\sigma_f$ is a sigmoid function, in an embodiment. In Equation 14 $W_f$ is a weight matrix.

Collectively, the $R_T$ component 1006 and the $T_T$ component 1008 produce an "input gate" result for a point in time ($i_t$). In one embodiment, the $R_T$ component 1006 provides the $T_T$ component 1008 with pairs of points, each pair being corresponding points in the two most recent 3D point clouds. The $R_T$ component 1006 performs registration of $x_t$ and $h_{t-1}$, in one embodiment. This provides pairs of corresponding points of these two datasets. Note that $h_{t-1}$ is included in $H_{t-1}$, along with S.

Based on the corresponding points from the $R_T$ component 1006, the $T_T$ component 1008 performs transformation of $X_t$ and $h_{t-1}$, which indicates the eye movement from $h_{t-1}$ to $X_t$, in one embodiment. Thus, the $T_T$ component 1008 may compare corresponding points in the two 3D point clouds and determine the movement in the person's face, in one embodiment. The $T_T$ component 1008 may also make an estimate of location on the display screen on which the person is gazing, based on the movement in the person's face. In other words, the $T_T$ component 1008 may make an estimate of eye movement, based on the movement in the person's face. The $T_T$ component 1008 may also determine the eye movement between the two time points, so as to determine the movement of the point of gaze.

The $T_T$ component 1008 outputs $i_t$. Equation 15 describes how the $R_T$ component 1006 and the $T_T$ component 1008 may generate $i_t$.

$$i_t = \tan h(W_i T_T(R_T(X_t, H_{t-1}))) \qquad \text{Equation 15}$$

In Equation 15, $R_T$ is the registration of $X_t$ and $h_{t-1}$, which provides pairs of corresponding points between these two data sets. Note that $h_{t-1}$ is included in $H_{t-1}$ with S. However, only $h_{t-1}$ is active in the registration (i.e., S is not involved). In Equation 15, $T_T$ is the transformation of $X_t$ and $h_{t-1}$, which provides the movement between these two data sets. For example, this provides the eye movement. $W_i$ is a weight matrix.

The multiplier 1012 is configured to perform an element-wise dot product, in an embodiment. The multiplier 1012 performs an element-wise dot product of the input eye vector $c_{t-1}$ and the output $f_t$ of the $T_s$ component 1004. The adder 1014 combines the output of the multiplier 1012 and the output $i_t$ of the $T_T$ component 1008. The output of the adder 1014 is the eye vector for time t, Q. Equation 16 summarizes generation of the eye vector.

$$c_t = f_t \circ c_{t-1} + i_t \qquad \text{Equation 16}$$

In Equation 17, the symbol, "∘" represents an element-wise dot product performed by the multiplier 1012. The "+" symbol represents vector addition by the adder 1014.

The $R_T$ component 1006 outputs what is referred to as a "registration result" $o_t$ to the refinement component 1010. In one embodiment, the registration result is pairs of corresponding points in $h_{t-1}$ and $X_t$. Equation 17 describes how the $R_T$ component 1006 may produce the registration result $o_t$.

$$o_t = W_o R_T(X_t, H_{t-1}) \qquad \text{Equation 17}$$

In Equation 17, $R_T$ is the registration of $X_t$ and $h_{t-1}$, which provides pairs of corresponding points between these two data sets. $W_o$ is a weight matrix.

The refinement component 1010 inputs the eye vector $c_t$ and the registration result $o_t$ from the $R_T$ component 1006 and outputs $h_t$. The refinement component 1010 is to remove or adjust small inconsistence in data. For example, the person slightly may move her lip, but the movement is very subtle and under threshold. Although the movement will not change the result of the forget gate $f_t$, this small movement should not be passed to integration layer 804 or next LSTM cell 802.

Equation 18 shows how the refinement component 1010 may generate $h_t$. The function $F_R$ refers to the aforementioned refinements made by the refinement component 1010.

$$h_t = F_R(o_t, c_t) \qquad \text{Equation 18}$$

Returning now again to the discussion of the integration layer 804 in FIG. 8, the integration layer 804 predicts the eye gaze based on inputs from the LSTM cells 802. In one embodiment, the prediction is based on Equation 19.

$$p_n = \Sigma_t^{\square} W_t H_t \qquad \text{Equation 19}$$

In Equation 19, $p_n$ is the next point of gaze, $H_t$ refers to the inputs from each of the LSTM cells 802. $W_t$ are parameters for the LSTM outputs $H_t$, and can be learned by training.

FIG. 11 is a flowchart of one embodiment of a process 1100 of an electronic device providing a person selection option on a display screen in response to detecting the person is gazing at the location on the screen. This is an example of performing an action based on a location of a display screen at which a person is gazing. Step 1110 includes the electronic device 100 detecting that the person is gazing at on option on the display screen 102. FIG. 12A shows a display screen 102 having a first option 1202 and a second option 1204. The first option 1202 is to go to the next page in a document being presented on the display screen 102 (the document is not shown in FIG. 12A). The second option 1204 is to go to the previous page in a document being presented on the display screen 102. For the sake of example, the electronic device 100 determines that the person is gazing at the first option 1202. Any of the techniques disclosed herein for detecting the location on a display screen at which a person is gazing may be used.

Step 1112 includes changing the appearance of the option. FIG. 12B shows one example of changing the appearance of the first option 1202. The appearance of the first option 1202 may be changed in any suitable manner including, but not limited to, highlighting, making brighter, displaying a ring or box around the option, etc.

Step 1114 is a determination of whether the gaze time is greater than a pre-determined time period. The time period may be a user-definable time period. For example, the time period could be one second, two seconds, three seconds, etc. If the person's eye gaze remains on the option for the time period, then an action associated with the option is performed at step 1116. In the present example, the electronic device 100 changes the display screen 102, such that the next page in the document is presented. Many other types of actions are possible.

If the user's gaze does not remain on the option for the pre-determined time period (step 1114=no), then the process ends without further action. In other words, the option is not selected in this case.

Note that steps 1112 and 1116 are examples of performing an action based on a location of a display screen at which a person is gazing. Thus, steps 1112 and 1116 are embodiments of step 414 (see FIG. 4).

Many variations of process 1100 are possible. For example, additional user input in the form of, for example, a voice command might be used in step 1114. Thus, the electronic device 100 might highlight the option in response to the user gazing at the option, and maintain the highlighting while the user keeps their gaze fixed on the option. However, to select the option, the user might use a voice command, in an embodiment.

Figure 13:
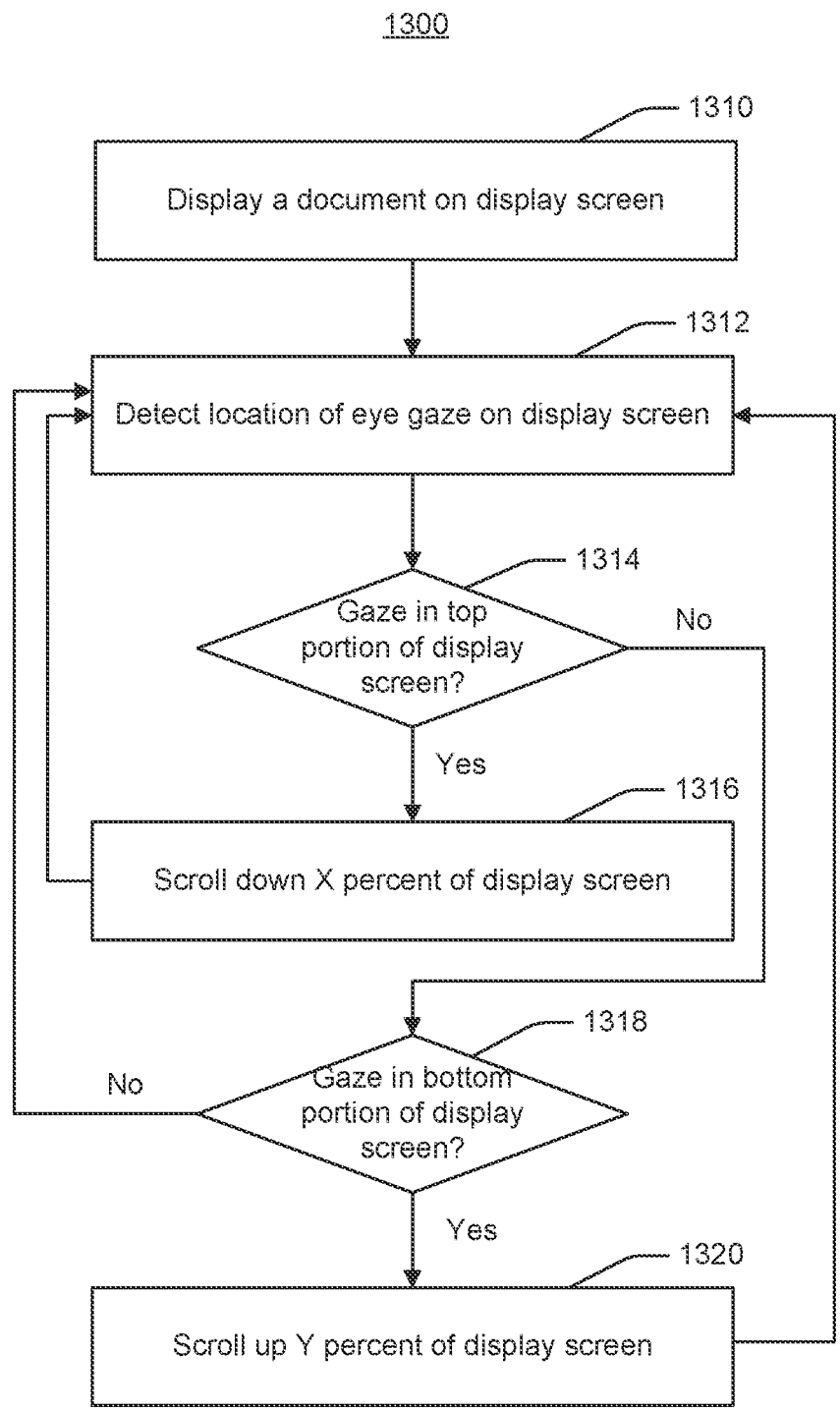
FIG. 13 is a flowchart of one embodiment of a process of performing an action in response to detecting a person's eye gaze.

FIG. 13 is a flowchart of one embodiment of a process 1300 of performing an action in response to detecting a person's eye gaze. Process 1300 includes further details of performing an action based on a location of a display screen at which a person is gazing. In one embodiment, process 1300 is performed by electronic device 100. Step 1310 includes displaying a document on the display screen 102 of the electronic device. Step 1312 includes the electronic device 100 detecting the location of a person's eye gaze on the display screen 102. Any of the techniques disclosed herein for detecting the location on a display screen at which a person is gazing may be used.

Step 1314 includes a determination of whether the eye gaze is in a top portion of the display screen 102. The top portion could be the top ⅓, top ¼, top ⅕, or some other percentage. If the person is gazing in the top portion, then the electronic device scrolls the document down X percent of the display screen 102, in step 1316. In one embodiment, X percent is equal to the size of the top portion that was discussed in step 1314, but X percent could be larger or smaller than the size of the top portion. The term "scroll" in this context has a broad meaning, and can include several small moves of the document content, one large move, etc. After step 1316, the process 1300 returns to step 1312 to detect the eye gaze. There may be a gap in time to allow the person to adjust to the movement of the document on the display screen 102.

If it is determined in step 1314 that the person's gaze in not in the top portion of the display screen (step 1314=no), then the process 1300 goes to step 1318. Step 1318 includes a determination of whether the eye gaze is in a bottom portion of the display screen 102. The bottom portion has the same size as the top portion, in one embodiment. However, the bottom portion may have a different size than the top portion. If the person is gazing in the bottom portion, then the electronic device scrolls the document down Y percent of the display screen 102, in step 1320. In one embodiment, Y percent is equal to X percent in step 1316. However, Y percent is not required to be equal to X percent in step 1316. In one embodiment, Y percent is equal to the size of the bottom portion that was discussed in step 1318, but Y percent could be larger or smaller than the size of the bottom portion. After step 1320, the process 1300 returns to step 1312 to detect the eye gaze. There may be a gap in time to allow the person to adjust to the movement of the document on the display screen 102.

Note that steps 1316 and 1320 are examples of performing an action based on a location of a display screen at which a person is gazing. Thus, steps 1316 and 1320 are embodiments of step 414 (see FIG. 4).

Many alternatives to process 1300 are possible. In one embodiment, rather than detecting whether the user's eye gaze is in the top portion (step 1314) or bottom portion (step 1318) of the display screen 102, the electronic device 100 determines whether the user's eye gaze is in the top portion (step 1314) or bottom portion (step 1318) of the document that is being presented on display screen 102.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for eye gaze tracking, the apparatus comprising:
a visible wavelength camera;
an infrared (IR) camera; and
one or more processors configured to:
generate a three-dimensional (3D) point cloud of a person's face from IR data captured from the IR camera;
generate a two-dimensional image of the person's face from visible wavelength data captured from the visible wavelength camera;
detect a symmetry plane of the person's face based on the 3D point cloud and the two-dimensional image, the symmetry plane divides the 3D point cloud into two portions including minimize a cost function to detect the symmetry plane, the cost function comprising a first parameter that provides a first weight for a first symmetrical half of the person's face and a second parameter that provides a second weight for a second symmetrical half of the person's face;
reconstruct the 3D point cloud based on the symmetry plane; and
detect and track eye gaze of the person's face based on the reconstructed 3D point cloud.

2. The apparatus of claim 1, wherein to reconstruct the 3D point cloud based on the symmetry plane the one or more processors are further configured to:
fill in data that is missing in a first portion of the 3D point cloud that corresponds to the first symmetrical half of the person's face based on 3D point cloud data from a second portion of the 3D point cloud that corresponds to the second symmetrical half of the person's face.

3. The apparatus of claim 1, wherein:
the apparatus further comprises a display screen; and
the one or more processors are further configured to determine a location on the display screen at which the person is gazing based on the reconstructed 3D point cloud.

4. The apparatus of claim 3, wherein the one or more processors are further configured to:
automatically scroll content of the display screen in response to the location on the display screen at which the person is gazing being in a pre-defined region of the display screen.

5. The apparatus of claim 4, wherein the one or more processors are further configured to:
change an appearance of an element on a display screen in response detecting that the person is gazing at the element.

6. The apparatus of claim 4, wherein the one or more processors are further configured to:
predict a next position of the person's gaze based on outputs of a sequence of long short-term memory (LSTM) cells.

7. The apparatus of claim 6, wherein the one or more processors are further configured to:
integrate image registration and image transformation into each of the LSTM cells.

8. The apparatus of claim 1, wherein the one or more processors are further configured to:

perform registration of the reconstructed 3D point cloud of the person's face to another 3D point cloud of the person's face using a long short-term memory (LSTM) cell.

9. The apparatus of claim 8, wherein the other 3D point cloud is a standard 3D point cloud that was captured with the person gazing at a known location.

10. The apparatus of claim 8, wherein the reconstructed 3D point cloud is a first reconstructed 3D point cloud captured at a first point in time, the other 3D point cloud is a second reconstructed 3D point cloud captured at a second point in time that is prior to the first point in time.

11. The apparatus of claim 1, wherein the one or more processors are further configured to:
perform transformation of the reconstructed 3D point cloud of the person's face to another 3D point cloud of the person's face using a long short-term memory (LSTM) cell.

12. The apparatus of claim 1, wherein the one or more processors are further configured to:
determine corresponding pairs of points between the reconstructed 3D point cloud of the person's face and a standard 3D point cloud of the person's face using a long short-term memory (LSTM) cell, the standard 3D point cloud captured with the person gazing at a known location; and
measure differences between the corresponding pairs of points using the LSTM cell.

13. The apparatus of claim 12, wherein the one or more processors are further configured to:
perform facial recognition of the person based on the differences between the corresponding pairs of points.

14. The apparatus of claim 1, wherein the one or more processors are further configured to:
determine corresponding pairs of points between a first version of the reconstructed 3D point cloud of the person's face captured at a first point in time and a second version of the reconstructed 3D point cloud of the person's face captured at a second point in time, including determine the corresponding pairs using a long short-term memory (LSTM) cell; and
measure differences between the corresponding pairs of points using the LSTM cell.

15. The apparatus of claim 14, wherein:
the one or more processors are further configured to determine a direction of an eye gaze of the person based on the differences between the corresponding pairs of points.

16. The apparatus of claim 1, wherein the one or more processors are further configured to:
generate a three-dimensional (3D) point cloud of a bilaterally symmetrical object from IR data captured from the IR camera;
generate a two-dimensional image of the bilaterally symmetrical object from visible wavelength data captured from the visible wavelength camera;
detect a symmetry plane of the bilaterally symmetrical object based on the 3D point cloud of the bilaterally symmetrical object and the two-dimensional image of the bilaterally symmetrical object, the symmetry plane divides the 3D point cloud into two portions; and
reconstruct the 3D point cloud of the bilaterally symmetrical object based on the symmetry plane.

17. The apparatus of claim 1, wherein the one or more processors are further configured to:
derive color information for voxels in the 3D point cloud based on the two-dimensional image.

18. A method for eye gaze tracking comprising:
generating a three-dimensional (3D) point cloud of a person's face from infrared (IR) data captured from an IR camera;
generating a two-dimensional image of the person's face from visible wavelength data captured from a visible wavelength camera;
detecting a symmetry plane of the person's face based on the 3D point cloud and the two-dimensional image, the symmetry plane divides the 3D point cloud into two portions, including minimizing a cost function to detect the symmetry plane, the cost function comprising a first parameter that provides a first weight for a first symmetrical half of the person's face and a second parameter that provides a second weight for a second symmetrical half of the person's face;
reconstructing the 3D point cloud based on the symmetry plane; and
tracking eye gaze of the person's face based on the reconstructed 3D point cloud.

19. An electronic device for detecting eye gaze, comprising:
at least one camera; and
one or more processors configured to:
generate an image of a person's face from data captured from the at least one camera; and
input the data into a long short-term memory (LSTM) cell to determine a direction of the person's gaze, wherein the LSTM cell comprises:
a registration component configured to look for corresponding points in a first three dimensional point cloud of the person's face and a second three dimensional point cloud of the person's face; and
a transformation component configured to measure differences between the corresponding points.

* * * * *

UNITED STATES PATENT AND TRADEMARK OFFICE
CERTIFICATE OF CORRECTION

| | |
|---|---|
| PATENT NO. | : 11,899,837 B2 |
| APPLICATION NO. | : 17/716438 |
| DATED | : February 13, 2024 |
| INVENTOR(S) | : Y. Zhu et al. |

It is certified that error appears in the above-identified patent and that said Letters Patent is hereby corrected as shown below:

In the Claims

Column 22, Line 21 (Claim 1, Line 15): After "two" and before "including" delete "portions" and insert -- portions, --.

Column 22, Line 55 (Claim 5, Line 4): After "response" and before "detecting" insert -- to --.

Signed and Sealed this
Nineteenth Day of March, 2024

Katherine Kelly Vidal
*Director of the United States Patent and Trademark Office*